Patented Mar. 16, 1937

2,073,937

UNITED STATES PATENT OFFICE 2,073,937

ESTERS OF POLYCARBOXYLIC AROMATIC ACIDS

Lucas P. Kyrides, Webster Groves, Mo., assignor, by mesne assignments, to Monsanto Chemical Company, a corporation of Delaware No Drawing. Application June 20, 1932, Serial No. 618,305

10 Claims. (Cl. 260—103)

This invention relates to a novel class of neutral organic compositions characterized in that they are dicarboxylic acid esters embodying as one group, an ester of glycollic acid or a homologue thereof. Examples include ethyl glycollate ester of mono methyl phthalate.

The invention has as one of its objects the provision of a class of organic esters which are

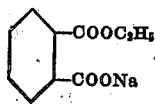 +ClCH₂COOC₂H₅ ⟶ 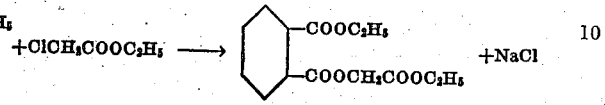

substantially non-volatile at ordinary temperatures, are compatible with cellulose ethers and esters, notably cellulose acetate and cellulose nitrate, and which are otherwise adapted for use as camphor substitutes in the manufacture of cellulose lacquers and plastics.
The esters disclosed herein are permanently monomeric, non-resinifiable and non-polymerizable. In this respect they are distinguishable from the vinyl type ester compositions which do polymerize and resinify.
A preferred class of compositions contemplated by the present invention is the phthalate ester group and particularly the phthalate esters in which one of the carboxyl groups of phthalic acid is joined to an alkyl, aryl or aralkyl alcohol radical, and the other carboxyl group is joined to an ester of glycollic acid.

The following example will serve to illustrate an embodiment of the present invention. The mono sodium salt of ethyl phthalate may be prepared conveniently by refluxing, preferably with mechanical agitation, 400 kilos of phthalic anhydride and 880 liters of absolute ethyl alcohol. The mixture is then allowed to cool to approximately 50° C., after which 159 kilos of anhydrous sodium carbonate are added slowly in order to avoid violent interaction. The resulting mixture is then heated, preferably with agitation, to assure the completion of the reaction. Thereafter 367.5 kilos of ethyl chloracetate (ethyl ester of chlor acetic acid) are added slowly while the mixture is agitated and maintained at the temperature of a steam bath.

The resulting reaction mixture is filtered from the sodium chloride which is washed with alcohol.
The alcohol is recovered by distillation, and the residual oil is steam distilled for three hours at approximately 100° C. The product so obtained is washed with a sodium carbonate solution until the solution is faintly alkaline to phenolphthalein.
If desired the ester may be treated with decolorizing charcoal or activated carbon such as "Darco" in the usual manner. To this end 1% of "Darco", based on the weight of the oil product, is uniformly distributed therein after which the mixture is maintained at 90° C. for approximately one hour before removing the carbon by filtration.

The reaction may be represented as follows:

+NaCl

The product boils at 223–224° C. at 24 milli-
meters without decomposition. It crystallizes at approximately 20° C. It is soluble in the ordinary lacquer solvents and has a retentivity with nitrocellulose as well as acetyl cellulose of approximately 100%; that is, a film containing equal parts by weight of the ester and cellulose nitrate or acetate shows no separation after the volatile solvent has been eliminated.

In lieu of the chloracetate ester one may employ an ester of the lower mono chlor substituted fatty acids such as chlor propionic acid or a chlor butyric acid.

Obviously, in lieu of the ethyl sodium phthalate employed in the foregoing example, one may prepare the corresponding methyl, propyl, butyl, benzyl, as well as phenyl sodium phthalate.
Similarly, in lieu of the ethyl ester of chlor acetic acid, one may substitute the chlor acetic acid ester of cresol phenol or of methyl, propyl, butyl, amyl, or benzyl alcohol, as well as chlor acetic esters of mono alkyl ethers of glycol such as the mono ethyl ether of ethylene glycol and the dialkyl ether of glycerol, etc. The esters of chloracetic acid may be replaced by the esters of other chlor fatty acids such as the alpha or beta chlor propionic acid esters or mixtures thereof. The foregoing ester products of my invention are non-resinifiable or non-polymerizable, and are plasticizers or camphor substitutes, in the same sense as diethyl phthalate, dibutyl phthalate and the like.

In lieu of phthalic acid or phthalic anhydride, one may substitute a chlorphthalic acid, adipic and similar dicarboxylic acids or their anhydrides. The same products are obtained by the interaction of the acid chlorides of dicarboxylic acids with glycollic acid esters and homologues thereof, such as esters of hydroxy acetic acid, alpha and beta hydroxypropionic and hydroxybutyric acids.

From the foregoing description it will be apparent that I have provided a novel class of organic compositions which are characterized in that they contain at least one alkyl or aralkyl glycollate group or a homologue thereof, and that these products are valuable plasticizers or high boiling solvents suitable for use in the manufacture of lacquers, varnishes and similar coating compositions, as well as in the preparation of molding compositions.

What I claim is:

1. A neutral alkyl glycollate ester of a mono alkyl phthalate, wherein each of said alkyl groups is saturated.

2. A neutral ester of phthalic acid, one carboxylic group of which is joined to a saturated aliphatic alcohol group, whereas the other carboxylic group is joined to a saturated alkyl ester of a hydroxy aliphatic acid selected from a group consisting of hydroxyacetic acid, hydroxypropionic acid, and hydroxybutyric acid.

3. A neutral ester of phthalic acid, one carboxylic group of which is joined to a saturated alkyl alcohol group, whereas the other carboxylic group is joined to a saturated alkyl ester of a hydroxy aliphatic acid selected from a group consisting of hydroxyacetic acid, hydroxypropionic acid, and hydroxybutyric acid.

4. A neutral ester of phthalic acid, one carboxylic group of which is joined to a saturated aliphatic alcohol group and the other carboxylic group is joined to a saturated aliphatic ester of glycollic acid.

5. A neutral ester of phthalic acid, one carboxyl group of which is joined to a saturated aliphatic alcohol group, and the other carboxylic group is joined to a glycollic acid which is esterified with a saturated alkyl ether containing alcohol.

6. A neutral acid of phthalic acid, one carboxyl group of which is joined to a saturated aliphatic alcohol group, and the other carboxylic group is joined to a glycollic acid which is esterified with a monoalkyl ether of a saturated glycol, said alkyl group being saturated.

7. The ester of the following formula:

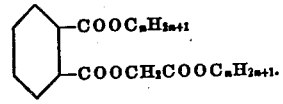

8. The ester of the following formula:

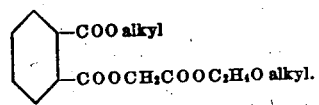

9. A neutral ester of chlor phthalic acid, one carboxyl group of which is joined to an aliphatic alcohol group whereas the other carboxyl group is joined to an aliphatic ester of a hydroxy aliphatic acid selected from a group consisting of hydroxy acetic acid, hydroxy propionic acid and hydroxy butyric acid the aliphatic groups having no unsaturated linkages.

10. The ethyl glycollate ester of mono ethyl phthalate.

LUCAS P. KYRIDES.